Feb. 7, 1950 K. E. LYMAN 2,496,732
QUICK DISCONNECTOR FOR ELECTRICAL SYSTEMS
Filed March 1, 1947
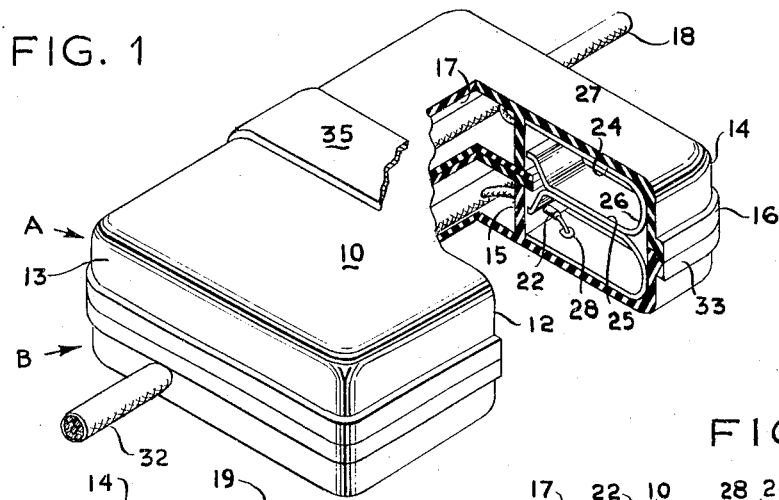
FIG. 1
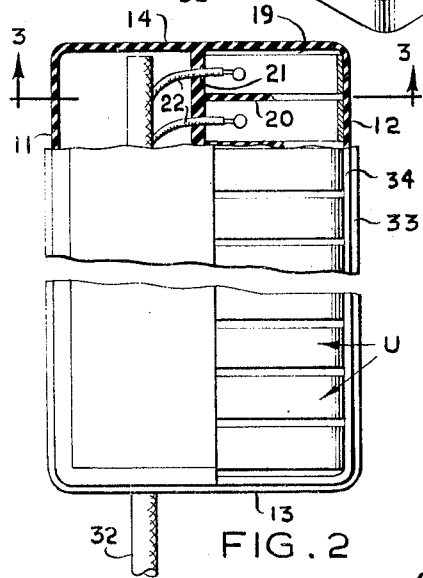
FIG. 2
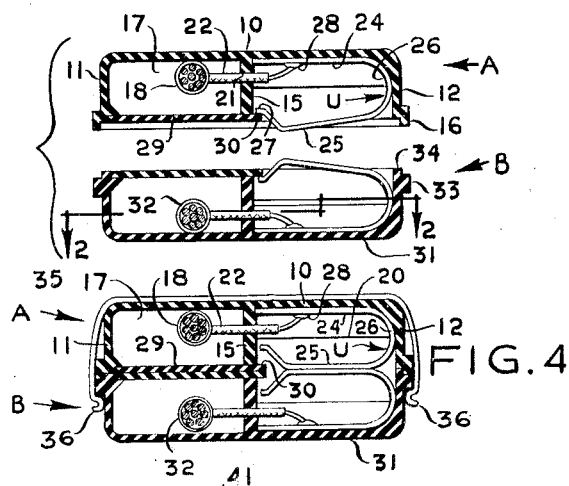
FIG. 3
FIG. 4
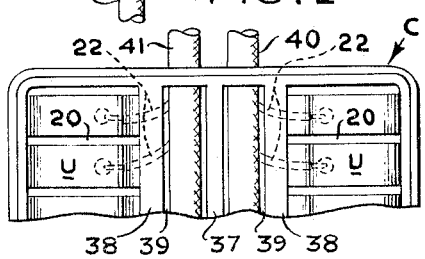
FIG. 5
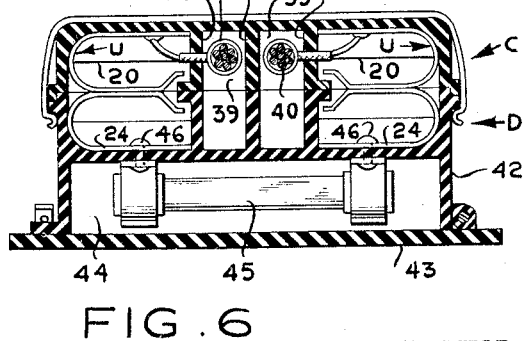
FIG. 6
INVENTOR
KENNETH E. LYMAN
BY
Toulmin & Toulmin
ATTORNEYS Patented Feb. 7, 1950

2,496,732

UNITED STATES PATENT OFFICE 2,496,732

QUICK DISCONNECTOR FOR ELECTRICAL SYSTEMS

Kenneth E. Lyman, Lake Forest, Ill., assignor to Tucker Corporation, Chicago, Ill., a corporation of Delaware Application March 1, 1947, Serial No. 731,778

2 Claims. (Cl. 173—328)

The present invention deals with electric systems such as those included in automotive vehicles and is concerned primarily with a disconnector which is included in the systems for quickly breaking the circuits.

An automobile of modern design ordinarily includes an electric system which embraces a plurality of circuits. It has long been recognized as necessary for each circuit to include a quickly detachable connection. As a matter of practical convenience a group of these connections are assembled in a harness.

The present invention has in view, as its foremost objective, the provision of a novel and improved disconnector which is capable of accommodating a plurality of circuits and to which definite advantages attach.

More in detail, the invention has as an object the provision of a disconnector or harness of the type indicated which comprises two complemental parts together with quickly detachable means for maintaining these parts assembled.

A particularly important object lies in the provision of a harness of this type in which each of the parts above identified is susceptible of complete assembly and connection with the wires of the circuit which it controls independently of the remainder of the automobile structure. Thus, all fitting and soldering on the assembly line is completely avoided.

Another object of the invention is to provide, in a disconnector or harness of the character indicated, novel contact elements which are particularly adapted for retention in the respective harness part and which, when the harness is assembled, provides good face to face contact between meeting points.

Still another object of the invention is to provide a harness of the type indicated which is capable of accommodating a plurality of circuits and in which the contacts for each circuit are structurally isolated so as to insure positive insulation between the several circuits.

Various other more detailed objects and advantages such as arise in connection with carrying out the above noted ideas in a practical embodiment will in part become apparent and in part be hereinafter stated as the description of the invention proceeds.

The invention, therefore, comprises a novel disconnector or harness designed particularly for use with the electric system of an automotive vehicle. The disconnector consists of complemental halves detachably held together with each half including a plurality of structurally isolated contacts with the wires connected thereto. The contacts in one half are designed for face to face engagement with the corresponding contacts of the other half.

For a full and more complete understanding of the invention, reference may be had to the following description and the accompanying drawings wherein:

Figure 1 is a perspective view of a disconnector or harness made in accordance with the precepts of this invention. In this view parts are broken away and shown in section to more clearly bring out details of the interior construction.

Figure 2 is a top plan view of one half of the disconnector with portions at one end being broken away and shown in section. This view is taken about on the plane represented by the line 2—2 of Figure 3.

Figure 3 is a vertical section taken normal to the showing of Figure 2 and showing the two parts in exploded relation. This view is taken about on the plane represented by the line 3—3 of Figure 2.

Figure 4 is a sectional view similar to Figure 3 illustrating the parts as assembled.

Figure 5 is a fragmentary top plan view of one end of one part of a modified embodiment of the invention.

Figure 6 is a transverse section through the form of harness depicted in Figure 5 and completely assembled.

Referring now to the drawing wherein like reference characters denote corresponding parts and first more particularly to Figures 1 to 4, inclusive, the improved harness or disconnector of this invention is shown as comprising complemental panels or halves A and B. For the purposes of this specification the panel A will be referred to as the top and the panel B as the bottom. Both of these panels may be made from any appropriate material having the required insulating properties and which is susceptible of being molded into the desired shape. The invention has particularly in mind the use of a rubber or rubber-like composition.

The top panel A is of an inverted shallow construction that is defined by a top wall 10, side walls 11 and 12, and end walls 13 and 14. Extending mid-way between the side walls 11 and 12 and from one end wall to the other is a central partition 15 which is preferably formed integrally with the top 10. It is important to note that the lower free edges of the walls 11, 12, 13, and 14 terminate in an offset flange 16 which constitutes the female element of a coupling as will be later described.

Between the side wall 11 and the partition 15 there is defined a chamber 17 which is intended to accommodate a cable such as is represented at 18. The cable 18 embraces a multiple of wires, as will be later explained, and this cable 18 passes through an opening in the end wall 14. It terminates short of the end wall 13.

The space between the central partition 15 and the side wall 12 is divided into a plurality of stalls 19 by transverse wall sections 20 which also are preferably formed integrally with the central partition 15 and top 10. Each of the harnesses will be designed to include a required number of these stalls 19 depending on the number of circuits which are to be controlled by the particular harness. It is important to note that there is a passage 21 which communicates between the chamber 17 and each of the stalls 19. These passages 21 accommodate wires 22 which lead out from the cable 18.

A U-shaped spring contact is identified in its entirety by the reference character U. There is a spring contact U in each of the stalls 19. Each of these spring contacts U includes a leg 24 which lies against the top wall 10 and, having an arcuate cross section may be flattened out after positioning to lock the entire contact in position. This is accomplished with what might be called a "snap" action. The contact U comprises this leg 24 and another leg 25 which is disposed in the open face of the stall. The two legs are connected by a bend portion 26 which bears against the side wall 12. The free end of the leg 25 is deformed to provide an offset retaining lip 27.

After each spring contact U is assembled in its respective stall 19, the conductor from the wire 22 is soldered to the leg 24 as indicated at 28. A closure member 29 is then positioned over the free edges of the side wall 11 and central partition 15 so as to close the chamber 17. This closure member 29 is sufficiently large to provide a flange 30 that extends beyond the central partition 15 so as to engage the retaining lips 27 of the spring contacts and effectively retain the latter in their stalls.

The construction of panel B is substantially the same as that described above in connection with the panel A. Instead of a top wall 10 the panel B has a bottom wall 31 which is in all other respects similar to the top wall 10 execept for this designation. It will be noted that a cable 32 passes in through an opening in the end wall 13 rather than through the end wall 14 in the panel A. The only real difference between the panels A and B is in the structure at the free edges of the side and end walls. The side walls 11 and 12 and end walls 13 and 14 of the panel B are formed with an outwardly projecting flange 33 which is spaced a slight distance from the free edges of the respective walls. This leaves a male coupling part 34 which is inserted within the flange 16 while the latter abuts the flange 33.

When the panels A and B are disassembled from each other each of the spring contacts U assumes the expanded position in which the lip 27 engages the flange 30. This action takes place because of the inherent resiliency of each spring contact. However, when the panels A and B are assembled as shown in Figure 4, the leg 25 of one spring contact engages with the leg 25 of the corresponding spring contact to establish a face to face engagement over a wide area. This insures of good conduction through and across the contacts. It wil be noted that when this face to face engagement is established, the lips 27 are held free of the flanges 30 as is clearly brought out in Figures 1 and 4.

The panels A and B may be held in assembled relation by any quickly detachable device. As illustrated in Figure 4, a U-shaped spring clip 35 is formed with beads 36 at the free ends of the legs which cooperate with the flanges 33 to maintain the assembled relation. Obviously, this spring clip 35 may be quickly removed whereupon the panels A and B are readily separated and the various circuits controlled by the meeting contacts are broken.

The modification

Figures 5 and 6 illustrate a modified form of the invention in which each complete harness includes a fuse for each circuit controlled thereby. Each harness comprises a pair of complemental panels C and D. So far as the stall and partition structure are concerned these panels C and D are substantial duplicates. The free or meeting edges are also provided with the same flange construction which provides the male and female coupling elements for establishing connection between the two.

The essential difference between the panels C and D on the one hand and the panels A and B on the other lies in the fact that each of the panels C and D has a central partition 37 which divides it into two halves. Between this central partition 37 and each side wall there is another partition 38 which cooperates with the partition 37 to define a chamber 39 which accommodates a cable. Thus, there is a cable chamber on each side of the central partition 37. Between each partition 38 and the adjacent side wall there are wall sections 20 which mark off the stalls 19.

A cable 40 passes through the end wall of the panel C and enters the cable chamber 39 on one side of the central partition 37. This cable includes a plurality of wires 22 which are connected to the spring contacts U in the stalls 19 on one side in the manner above described in connection with Figures 1 to 4, inclusive. Likewise, a second cable 41 passes into the cable chamber on the opposite side of the central partition 37 and the wires 22 thereof are connected to the spring contacts U at the opposite side.

In the bottom panel D a slightly different arrangement obtains. This panel D is supported by a pedestal 42 from a base 43, there being a chamber 44 defined within the pedestal and beneath the bottom of the panel. Positioned in this chamber 44 are a plurality of fuses 45. Each fuse 45 is conductively connected at one end with the leg 24 of the spring contact U by a rivet 46 which passes through the bottom wall of the panel and at its other end is connected in exactly the same manner to the spring contact U at the opposite side of the panel.

When the panels C and D are assembled the circuit is from the cable 40 through one of the wires 22 to the top spring contact U, thence to the bottom spring contact U because of the legs 25 being in face to face engagement, and through the rivet 46 to the fuse 45. The circuit goes back from the other end of the fuse 45 to the cable 41 in exactly the same manner.

While preferred specific embodiments of the invention are hereinbefore set forth, it is to be clearly understood that the invention is not to be limited to the exact constructions illustrated

What is claimed is:

1. In a harness of the character described, an open face shallow panel having a cable chamber and a plurality of stalls communicating therewith, a U-shaped spring contact in each of said stalls, each of said contacts having a pair of legs with one of said legs projecting beyond the open face of the panel, and closure means for said cable member, said closure means including a flange projecting partially over the stalls and engaging the projecting legs of said contacts to maintain the contacts in assembled relation in their respective stalls.

2. In a harness of the character described, an open face shallow panel defined by a bottom, side, and end walls, a partition extending between said end walls and cooperating with one of said side walls to define a cable chamber, a cable in said cable chamber and passing through one of said end walls, a plurality of wall sections extending from said partition to the other of said side walls and defining a plurality of stalls, said partition being formed with openings establishing communication between said chamber and each of said stalls, a wire leading from said cable and passing through one of said openings to the respective stall, a U-shaped spring contact in each of said stalls, each of said contacts having a leg secured to the bottom of said panel with the wire leading into the respective stall being conductively connected to said leg and another leg projecting beyond the plane of the free edges of said walls, said projecting leg having an offset lip, and a closure for said cable chamber engaging the offset lip of the legs of the spring contacts to maintain the contacts in assembled position in the stalls.

KENNETH E. LYMAN.

REFERENCES CITED

The following references are of record in the file of this patent:

UNITED STATES PATENTS

| Number | Name | Date |
| --- | --- | --- |
| 433,706 | Widdifield et al. | Aug. 5, 1890 |
| 1,122,290 | Mack et al. | Dec. 29, 1914 |
| 1,620,693 | Royal | Mar. 15, 1927 |
| 2,071,769 | Schlicker et al. | Feb. 23, 1937 |
| 2,086,641 | Riley | July 13, 1937 |
| 2,130,424 | Grant | Sept. 20, 1938 |

FOREIGN PATENTS

| Number | Country | Date |
| --- | --- | --- |
| 657,380 | Germany | Feb. 17, 1938 |